July 25, 1972 R. C. HORTON 3,679,526
SONIC OR ULTRASONIC CUTTING APPARATUS
Filed April 8, 1970 2 Sheets-Sheet 1

INVENTOR.
ROBERT C. HORTON
BY:
Ervin B. Steinberg

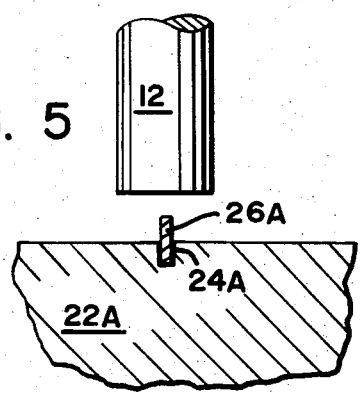
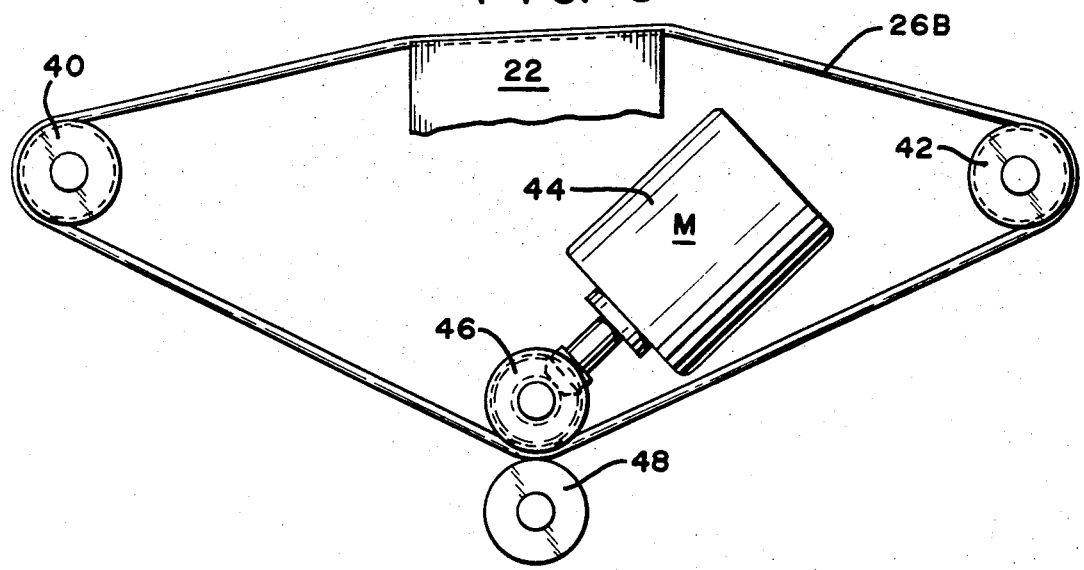
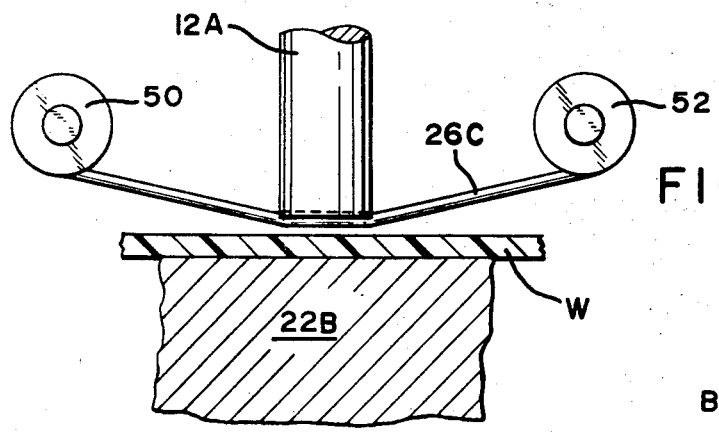

United States Patent Office 3,679,526
Patented July 25, 1972

3,679,526
SONIC OR ULTRASONIC CUTTING APPARATUS
Robert C. Horton, Rochester, N.Y., assignor to Branson Instruments, Incorporated, Stamford, Conn.
Filed Apr. 8, 1970, Ser. No. 26,489
Int. Cl. B29c 27/08; B32b 31/20
U.S. Cl. 156—580         11 Claims

ABSTRACT OF THE DISCLOSURE

A cutting apparatus operating in the sonic or ultrasonic frequency range comprises an oscillating tool impacting on an anvil in order to cut or slit sheet material interposed. A portion of a movable strip interposed in the gap between the tool and anvil acts as a knife edge, the strip being advanced to provide a new cutting edge.

---

This invention refers to an apparatus for cutting or slitting material by high frequency energy, particularly with vibratory energy in the sonic or ultrasonic frequency range.

This application for Letters Patent is related to U.S. Pat. No. 3,378,429 issued Apr. 16, 1968, Edward G. Obeda, entitled "Method and Apparatus for Treating Material With Sonic Energy." The application refers, moreover, to ultrasonic cutting or slitting devices adapted for cutting or slitting sheet plastic materials of polyethylene, vinyl polymers, nylon, Mylar, Dacron, Orlon, woven, knitted or matted fibrous materials as shown for instance in U.S. Pats. Nos. 3,308,003 dated Mar. 7, 1967; 3,086,-288 dated Apr. 23, 1963, and 2,307,424 dated Jan. 5, 1943.

The prior art noted heretofore discloses vibrating or resonating tools wherein a sharp edge of such a tool is impacted on an anvil. Material interposed between the vibrating tool and the anvil is cut responsive to repetitive impact or is slit when advanced relative to the vibrating tool and anvil position. As disclosed, for instance in U.S. Pat. No. 3,378,429 supra, carpeting or woven material manufacture in a standard width can be slit by means of an arrangement of the type described and, if the frequency of vibration is sufficiently high, the sonic energy imparted to the material during the severing process produces a sealing or fusing of the loose ends of the fibers, thus preventing unraveling. Of course, the material must be made of fibers which lend themselves to sealing responsive to the dissipation of sonic energy. Suitable frequencies are in the order from 1 kHz. to 100 kHz., but excellent results have been achieved with commercially available standard ultrasonic devices operating in the range from 16 to 45 kHz.

One of the shortcomings of the above described cutting devices operating in the sonic or ultrasonic frequency range has been the rapid wear of the knife edge. The high impact rate and force inherent in an ultrasonic operation cause a rapid wear of the sharp edge of the ultrasonic tool and the apparatus, therefore, is disabled very rapidly. The vibrating tool, usually a mechanical resonator also known as horn, mechanical amplitude transformer and the like, see for instance "Ultrasonic Engineering" (book) by Julian R. Frederick, John Wiley & Sons, Inc., New York, N.Y., 1965, pp. 87 through 103, is a relatively expensive device, frequently being made of titanium metal. While replaceable tool tips are available, these must be intimately fastened to the resonator in order to achieve proper acoustic coupling and to minimize energy loss between the tool tip and the resonator body. The present invention is directed to an improvement in sonic or ultrasonic cutting devices by providing an expendable cutting edge which is readily replaced and, in the preferred example, is an elongated strip material which can be advanced so as to provide always a new cutting edge. Quite specifically, in a typical embodiment of the invention, the anvil is provided with a recess to receive therein a portion of a wire, the wire forming the cutting edge for the workpiece interposed between the anvil and the oscillating resonator. During the process of cutting the workpiece the resonator impacts on the wire. When the particular wire portion is dulled due to repetitive impact, the wire is advanced relative to the anvil so as to cause a new portion of the wire to be interposed in the gap between the anvil and resonator. It will be possible, of course, to provide a means for advancing the wire in a step by step manner, as is known for instance in connection with typewriter ribbon transport mechanisms. Moreover, the novel arrangement disclosed hereafter provides a simple and convenient means for selecting the hardness of the cutting edge to suit various conditions, specifically the range of the cutting edge can be varied from soft to a very hard surface, depending on the material to be cut and on the material selected to form the resonator.

One of the principal objects of this invention is, therefore, the provision for a new and improved cutting or slitting apparatus for sheet material, which apparatus overcomes one or more of the disadvantages and limitations of the prior art devices.

Another important object of this invention is the provision of a cutting or slitting apparatus operating in the sonic or ultrasonic frequency range and including a readily replaceable surface acting as a cutting edge.

A further important object of this invention is the provision of a sonic or ultrasonic apparatus for cutting or slitting materials, the apparatus being provided with a ribbon which forms the cutting edge, and such ribbon having different portions adapted to be sequentially interposed in the gap between an anvil and a resonating tool, the sequential movement of the ribbon material being governed by the wear of the cutting edge.

Further and still other objects of this invention will be more clearly apparent by reference to the following description, when taken in conjunction with the accompanying drawings, in which:

FIG. 5 is a view of a further alternative embodiment;

FIG. 6 is a schematic illustration of a further embodiment of the present invention; and FIG. 7 is an illustration of a still further embodiment.

Figure 1:
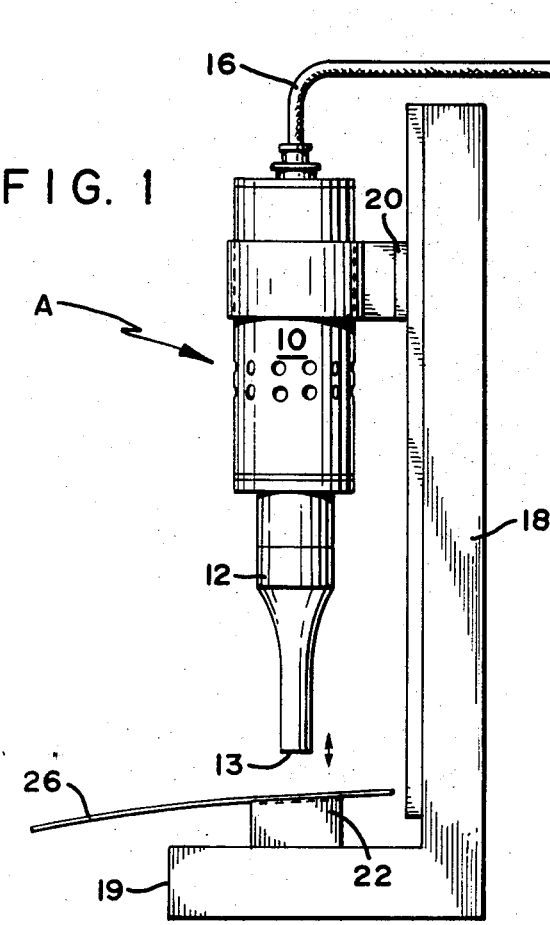
FIG. 1 is a schematic elevational view of a preferred embodiment of the present invention.

Referring now to the figures and FIG. 1 in particular, letter A identifies a source of sonic or ultrasonic energy comprising a converter 10 which is fitted with a solid resonator 12. The converter contains piezoelectric or magneto-strictive transducing means which are excited by electrical high frequency energy from a generator 14 via a cable 16 and convert the electrical energy supplied to mechanical vibration which, in turn, is transmitted to the solid resonator 12 mechanically coupled to the transducing means. The resonator 12 is dimensioned to be resonant at the applied frequency, causing the frontal surface 13 to be disposed at an antinodal zone of longitudinal motion. The frontal surface 13 undergoes vibration in a direction along the longitudinal resonator axis as shown by the arrow. The converter unit is mounted to a stand 18 by mounting means 20. Responsive to motive means (not shown), such as fluid pressure means, the mounting means 20 may be raised or lowered relative to the platform 19 which supports an anvil 22.

The converter unit 10, resonator 12, generator 14 and stand 18, shown in a somewhat schematic form, are well known in the art and may be purchased as commercial assemblies, such as Model 227 ultrasonic assembly stand available from Branson Sonic Power Company, Danbury, Conn. A similar converter unit with resonator, mounting means and stand is depicted also in U.S. Pat.. No 3,308,003 supra and the detailed construction of a converter unit is depicted in U.S. Pat. No. 3,328,610 S. E. Jacke et al., dated June 27, 1967, entitled "Sonic Wave Generator." Units of this type are commonly operating in the frequency range between 16 kHz. and 40 kHz., but other high frequencies in the range between 1 and 100 kHz. shall not be excluded.

The anvil 22 is provided with a groove 24 for supporting therein a portion of an elongated strip 26. In a typical example the strip 26 is a thin steel wire of circular cross-section having a diameter from 0.001" to 0.250", but preferably from 0.005" to 0.100" diameter. The upper and exposed portion of the wire which is raised above the anvil top surface forms a cutting surface or cutting edge for a workpiece W if such workpiece, such as sheet material, is pressed against the anvil responsive to the resonator 12 being urged against the anvil 22 and the frontal surface 13 is undergoing oscillatory motion, which typically ranges from 0.001" to 0.003". The above dimensions are merely illustrative of typical values but shall not be considered limiting.

Figure 2:
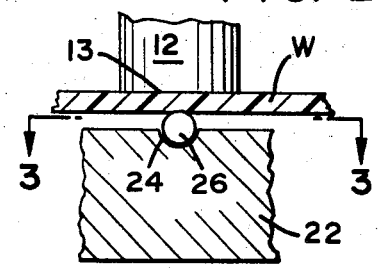
FIG. 2 is an enlarged sectional view of the anvil and resonator.
Figure 3:
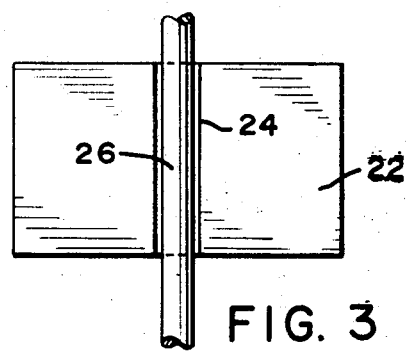
FIG. 3 is a plan view along the line 3—3 in FIG. 2.

As shown in FIGS. 1 to 3, material W to be cut or slit is interposed between the resonator's frontal surface 13 and the anvil, the converter 10 is excited from the generator 14 and is lowered responsive to the motive means (not shown). The frontal surface of the resonator is then urged toward contact with the anvil 22 and as the frontal surface undergoes vibratory motion, the resonator repetitively impacts on the workpiece W, cuts through the workpiece W and finally impacts on the strip material 26. By feeding the workpiece W relative to the cutting station, slitting is obtained.

The strip material can be selected to wear out faster than the resonator's frontal surface, thereby preserving the integrity of the more expensive resonator. In the prior art, the resonator or the anvil were made to have knife surfaces which would wear out, necessitating the replacement of the more valuable parts. The fast wear is due to the very high acceleration and impact forces prevailing when operating in the ultrasonic frequency range.

Figure 4:
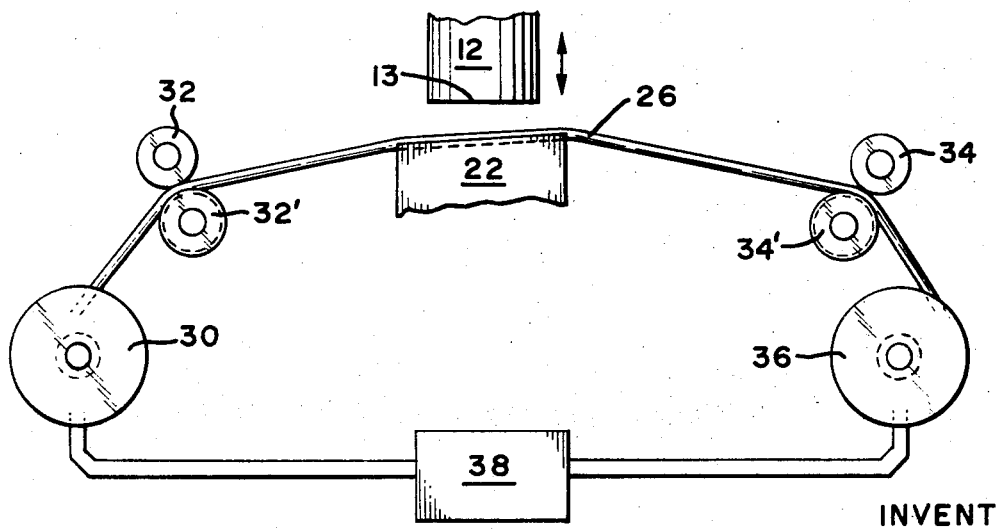
FIG. 4 is an illustration of an alternative arrangement.

FIG. 4 shows a variation of the arrangement shown heretofore, the strip material 26 is unwound from a supply roll 30, fed via two guide rollers 32 and 32' into the groove of the anvil 22, and guided between guide rollers 34 and 34' to a roller 36. A feed advance mechanism 38 is coupled to the rollers 30 and 36 to control the motion of the rollers and thereby the advance of the strip material through the work station. The feed mechanism operates similar to a typewriter ribbon advance mechanism and most suitably advances the strip in stepped fashion. Alternatively, the strip material may be advanced on a continuing basis. The strip may be advanced whenever the portion impacted upon by the resonator is worn out, or like a typewriter ribbon, the strip may be reciprocated. Since the resonator operates with a very high frequency, the advance mechanism 38 can be controlled by a timing device.

FIG. 5 shows a further embodiment wherein the strip material 26A is of rectangular cross-section and supported edge-wise within a recess 24A of the anvil 22A.

FIG. 6 shows the strip 26B as a continuous loop. The strip is fed stretched over idler rollers 40 and 42 while being driven by motive means 44 coupled to roller 46 which is opposed by a roller 48. The strip material 26B, as before, may be advanced in step-by-step fashion and recirculated until all portions are worn. Alternatively, the loop may be fed through the anvil only once, each portion being exposed to the impact of the resonator until fully worn.

FIG. 7 shows a still further alternative embodiment of the invention. The strip or wire material 26C is disposed in a recess of the resonator 12A and as the resonator moves toward the anvil 22B and vibrates, the workpiece W is severed. The strip 26 is supported by a set of rollers 50 and 52, one roller being spring-biased while the other roller is fixed, thus permitting limited vertical motion of the resonator to facilitate the insertion and removal of a workpiece.

As previously stated, the hardness and size of the strip material can be selected for the particular workpiece and resonator material, thus providing a high degree of flexibility not achieved when the cutting edge forms an integral part of either the anvil or resonator.

What is claimed is:

1. A sonic or ultrasonic cutting apparatus comprising:
   an anvil;
   a solid resonator adapted to oscillate at a high frequency within the range of sonic and ultrasonic frequencies;
   means for urging said resonator into contact with said anvil whereby to impart, responsive to the oscillatory motion of said resonator, vibratory energy to a workpiece disposed between said anvil and resonator;
   strip material forming a cutting edge interposed in the space between said anvil and resonator for cutting the workpiece responsive to the vibratory motion of said resonator relative to said anvil; and
   groove means disposed in said anvil for supporting said strip material.

2. A sonic or ultrasonic cutting apparatus as set forth in claim 1 said strip material being wire.

3. A sonic or ultrasonic apparatus as set forth in claim 2, said wire being steel.

4. A sonic or ultrasonic cutting apparatus as set forth in claim 1, said groove means provided in said anvil supporting said strip material in such a position that an exposed surface of said strip material is impacted by said resonator.

5. A sonic or ultrasonic cutting apparatus as set forth in claim 1 and means for periodically advancing said strip material to cause a new portion thereof to be interposed in said space.

6. A sonic or ultrasonic apparatus as set forth in claim 5, said strip material being in the form of an endless loop.

7. A sonic or ultrasonic apparatus as set forth in claim 6, and means for sequentially interposing different portions of said loop in said space.

8. A sonic or ultrasonic apparatus as set forth in claim 1, said strip material being wire having a diameter between 0.001 and 0.250 inch.

9. A sonic or ultrasonic apparatus as set forth in claim 8, said resonator oscillating at a frequency in the range from 1 to 100 kHz.

10. A sonic or ultrasonic cutting apparatus comprising:
    an anvil having means for retaining strip material;
    strip material disposed in said means for retaining and said strip material being arranged and dimensioned to cause a portion of said strip material to be raised above the surface of said anvil and forming a cutting edge for a workpiece disposed on said anvil;
    a solid resonator adapted to oscillate at a high frequency within the range of sonic and ultrasonic frequencies;
    means for urging the frontal surface of said resonator toward said anvil for contact with said portion of strip material; and
    means for setting said resonator into resonance, whereby said frontal surface is caused to undergo high frequency oscillations for cutting through a workpiece interposed between said anvil and resonator, said strip portion under the repetitive impact of said resonator acting as a cutting edge.

11. A sonic or ultrasonic apparatus comprising:
a solid resonator adapted having a frontal surface to oscillate at a high frequency within the range of sonic and ultrasonic frequencies;
an expendable strip material serving as a cutting edge disposed for opposing the frontal surface of said resonator; and
means for urging said frontal surface into contact with said strip material whereby to impart responsive to oscillatory motion of said resonator vibratory energy to a workpiece disposed between said strip material and frontal surface to cause a cutting action.

References Cited
UNITED STATES PATENTS

| | | | |
|---|---|---|---|
| 3,562,041 | 2/1971 | Robertson | 156—580 X |
| 3,551,259 | 12/1970 | Schwarzkopf | 156—515 X |

BENJAMIN A. BORCHELT, Primary Examiner

J. J. DEVITT, Assistant Examiner

U.S. Cl. X.R.

156—73, 515; 228—1